United States Patent [19]

Drumm

[11] Patent Number: 5,287,119
[45] Date of Patent: * Feb. 15, 1994

[54] COMPUTER INPUT DEVICE USING AN ORIENTATION SENSOR

[75] Inventor: Donald E. Drumm, Billerica, Mass.

[73] Assignee: Wang Laboratories, Inc., Lowell, Mass.

[*] Notice: The portion of the term of this patent subsequent to Nov. 26, 2008 has been disclaimed.

[21] Appl. No.: 775,674

[22] Filed: Oct. 11, 1991

Related U.S. Application Data

[63] Continuation of Ser. No. 588,499, Sep. 25, 1990, Pat. No. 5,068,645, which is a continuation of Ser. No. 267,413, Nov. 4, 1988, abandoned, which is a continuation-in-part of Ser. No. 108,176, Oct. 14, 1987, abandoned.

[51] Int. Cl.$^5$ ............................................. G09G 1/00
[52] U.S. Cl. .............................. 345/158; 340/825.19; 341/21; 345/157
[58] Field of Search .............. 340/825.19, 706, 709, 340/710, 686, 689; 341/20, 21, 157; 318/16, 581; 434/112; 200/52 A, 61.45 R, 6 A, 61.46, 61.83, 61.6, 220; 73/653, 655, 503

[56] References Cited

U.S. PATENT DOCUMENTS

| | | | |
|---|---|---|---|
| 3,643,148 | 2/1972 | Brown et al. | 340/710 |
| 4,323,829 | 4/1982 | Witney et al. | 341/21 |
| 4,567,479 | 1/1986 | Boyd | 340/709 |
| 4,605,927 | 8/1986 | Katz et al. | 340/825.19 |
| 4,688,037 | 8/1987 | Krieg | 341/21 |
| 4,862,172 | 8/1989 | Ross | 341/157 |

FOREIGN PATENT DOCUMENTS

| | | |
|---|---|---|
| 892802 | 2/1972 | Canada . |
| 1081342 | 9/1978 | Canada . |
| 1039406 | 7/1980 | Canada . |

*Primary Examiner*—Donald J. Yusko
*Assistant Examiner*—Edwin C. Holloway, III
*Attorney, Agent, or Firm*—Kenneth L. Milik

[57] ABSTRACT

A device for controlling a cursor on a data terminal display screen. The device is in the form of a headset and includes an orientation sensor which provides an electrical signal related to the orientation of the device without it being adjacent to any fixed surface. The orientation sensor includes a hollow spherical housing having at least one light source/detector pair mounted opposingly in the inner wall, along an axis extending through the center point of the housing. The housing is half-filled with a transparent liquid having a specified viscosity and index of refraction and half-filled with air. Light beams emitted from the sources are refracted upon passing through the boundary between the air and the liquid. As the orientation sensor rotates with respect to the vertical axis, the changing refraction angle of the light beam causes the detector to sense changing intensities of light, which are representative of the angle of rotation. Multiple light source/detector pairs spaced within the spherical housing allow measurement of direction and magnitude of angular change. Integral with the input device is a speaker independent voice control circuit which recognizes short isolated command words ending in voiced or fricative sounds for controlling display functions.

4 Claims, 14 Drawing Sheets

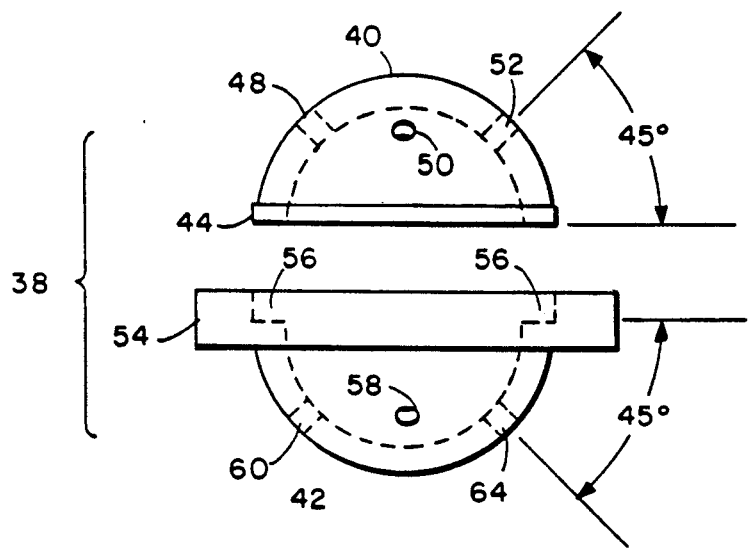
FIG. 3
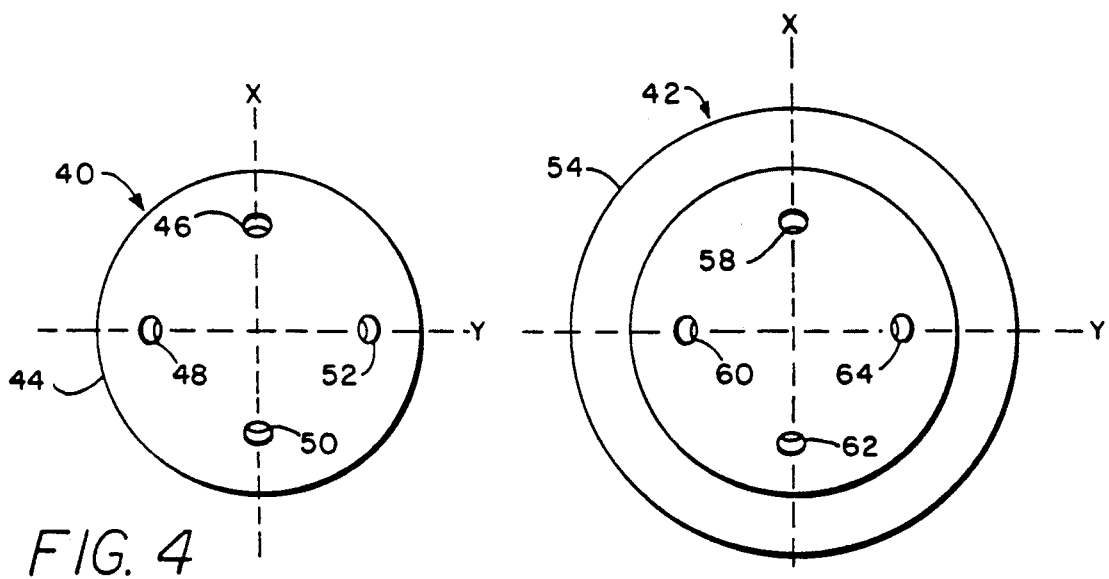
FIG. 4
FIG. 5
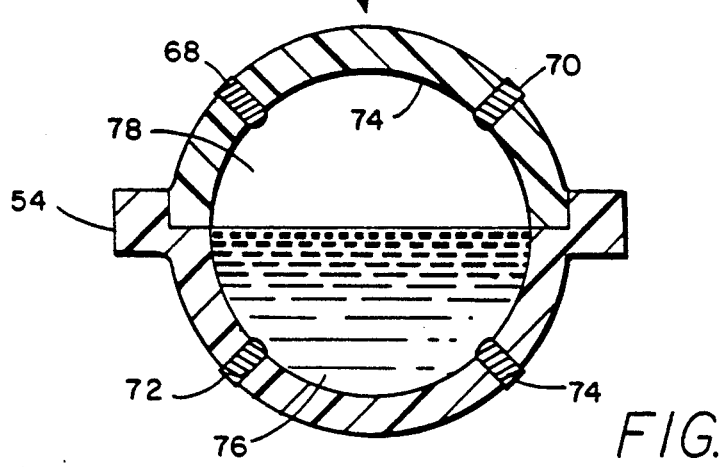
FIG. 6

FE = VOICE CONTROL DATA
FD = +X DIRECTION (8 BITS)
FC = -X DIRECTION (8 BITS)
FB = +Y DIRECTION (8 BITS)
FA = -Y DIRECTION (8 BITS)

COMPUTER INPUT DEVICE USING AN ORIENTATION SENSOR

This is a continuation of copending application Ser. No. 07/588,499, filed on Sep. 25, 1990 now U.S. Pat. No. 5,068,645 which is a continuation of Ser. No. 267,413 filed on Nov. 4, 1988, now abandoned, which is a continuation-in-part of Ser. No. 108,176 filed on Oct. 14, 1987 now abandoned.

FIELD OF INVENTION

This invention related to position or orientation sensors, and more particularly to an orientation sensor used to provide cursor control input to a computer system.

BACKGROUND

There are various devices known for positioning or controlling the movement of a cursor on a computer display screen. The most common in use is the conventional "mouse" device, in the form of a hand-sized housing which is moved over a flat desktop. Motion over the desktop is sensed by means of a mechanically rotating ball or optically reflective sensor, and digital data are generated which translate into corresponding motion of the cursor on the display screen. Other cursor positioning devices include the graphics input tablet, consisting of a flat sensor pad and a hand-held pointing stylus, which translates the analog motion of the pointing stylus into digitized data used to control the location of the cursor on the display screen. Still other cursor movement devices relay on focused light sources, held by the user or fixed on the user's person, as on a pilot's helmet. As the user aims the light beam, sensors mounted around a display screen track the movement of the beam and translate this movement into a corresponding movement of the cursor on the display screen.

Devices such as those discussed above are basically effective, although they suffer from certain disadvantages. Most cursor positioning and controlling devices require a fixed, generally level surface upon which to operate, or must operate in conjunction with a stationary sensor of some type; that is, motion is sensed with respect to a fixed medium and positional data signals are generated and presented to a computer for translation into a corresponding cursor movement. The need for a fixed surface of stationary sensor constrains how the user may interact with the display device. The user must normally sit close to the display screen and be provided with ample level desk space for placement of the graphics tablet or movement of the "mouse." In the case of the stationary sensor, the user must confine movement to keep the light beam without range of the sensor array and aimed appropriately.

Still another disadvantage of many present-day cursor movement devices is that they require a level of manual dexterity for their effective use. This requirement has its greatest impact in the area of the physically disabled. To operate a computer, a disabled person may find that a mouse, a graphics tablet, or even a keyboard is useless to him.

The present invention overcomes the disadvantages of the prior art devices, such as the requirements of a flat desktop, among of a light source, or the manual dexterity of the user.

SUMMARY OF INVENTION

In accordance with the present invention, a novel computer input device is provided for a computer display unit having a display screen. The computer input device includes an orientation sensor which generates an electrical signal representative of the physical orientation of the device, without it being adjacent to any fixed surface, and the electrical signal is used to position and otherwise control a cursor on the display screen.

The computer input device is in the form of a headset to be worn by a user. Wearing the device, the user makes slight tilting movements of the head, and this effects a corresponding movement of the cursor on the display screen.

The orientation sensor operates on the principle of a light beam being refracted as it passes from one transparent medium to another. The orientation sensor includes a hollow spherical housing, with a defined vertical axis passing through its center point. Contained within the spherical housing are two fluid media. The first medium is gaseous and the second medium is liquid, and each has a predetermined viscosity and a different index of refraction. The liquid medium fills the spherical housing to the one-half level and the boundary between the liquid and gas intersects the center point of the spherical housing.

A light source in the form of an LED, and a photodetector in the form of a phototransistor are mounted opposingly in the inner wall of the spherical housing on an axis that extends through the center point of the housing, such that light emitted from the light source must first pass through the center point of the spherical housing before being detected by the photodetector. The light source emits a focused beam and the photodetector receives the focused beam and generates an analog voltage representative of the intensity of the beam, as it is received by the photodetector.

When the focused beam emitted from the light source passes through the boundary between the gaseous and liquid media, refraction of the beam occurs at the boundary at an angle which is determined by the angle at which the incident light beam intersects the boundary. If the spherical housing is oriented so that the incident light beam is perpendicular to the boundary, the light beam will not be refracted at all. The photodetector will receive the full intensity of the light beam, and will generate a maximum output voltage. As the spherical housing is rotated with respect to the vertical axis, the angle from the vertical axis to the incident light beam will increase, and the refraction angle of the light beam will increase. As the refraction angle increases, the photodetector receives a decreasing portion of the light beam, and the photodetector generates a decreasing voltage. The output voltage of the photodetector is therefore representative of the angle at which the incident beam intersects the boundary between the two media. The liquid medium always flows to the bottom half of the spherical housing to maintain equilibrium.

In the preferred form of the present invention, the orientation sensor includes four light source/photodetector pairs, each pair mounted opposingly on axes passing through the center point of the spherical housing. The four light source/photodetector pairs are positioned 90 degrees apart. The light sources are mounted on the same side of the spherical housing, the photodetectors are mounted on the opposite side, and the output voltages of the photodetectors are sensed differentially.

In the normal orientation of the sensor, the light sources are located in the upper half of the spherical housing, exposed to the gaseous media, each 45 degrees above the horizontal axis. The photodetectors, in turn, are located in the lower part of the spherical housing, submerged in the liquid media, each 45 degrees the horizontal axis. Two coplanar light source/photodetector pairs define an X axis and the other two coplanar pairs define a Y axis. The output voltages for each pair of photodetectors within the same axis are compared in a differential amplifier, and the resultant output of the differential amplifier indicates the direction of rotation as well as the magnitude.

In the normal orientation of the sensor, with each device at 45 degrees from the horizontal and the surface of the liquid media, the voltage at the output of the differential amplifier is zero for both the X and Y axis. When the spherical housing is rotated plus or minus 45 degrees, the output of the differential amplifier becomes positive or negative, depending on the direction of rotation. The orientation sensor of the present invention determines rotation of any angle with respect to a defined vertical axis, with a single device.

The output signals of the orientation sensor are converted into digital data, formatted to simulate a cursor control device, and presented to a computer as control signals for positioning a cursor on a display screen. A user controls cursor movement by simple angular movement of his head.

The computer input device also includes a voice control circuit which allows the user to perform standard select functions. The voice control circuit includes a speaker independent voice detection and control means which responds to two primary sound types, fricative and voiced.

The present invention thus provides a user with the capability of moving the cursor, selecting items on menus, making graphic illustrations and performing other control functions, without the use of the hands.

In an alternative embodiment of the orientation sensor of the present invention, a hollow transparent sphere contains the two transparent media. The transparent sphere is disposed in an opaque spherical enclosure, which has light source/photodetector pairs mounted therein and oriented as described above. The light source/photodetector pairs contact the outer surface of the transparent sphere and function as in the above-described embodiment.

Beyond the uses hereabove described, the novel orientation sensor of the present invention could be used in any application in which the determination of angular rotation is required, such as clinometers, level sensing mechanisms, or feedback devices for robotic machines.

The present invention will be better understood from the following description when considered in conjunction with the accompanying drawings.

DESCRIPTION OF THE DRAWINGS

FIG. 3 illustrates a side view of the upper and lower hemispherical members, particularly showing their interrelationship;

FIG. 4 illustrates a top view of the upper hemispherical member, showing the relationship of the apertures to the X and Y axes;

FIG. 5 illustrates a bottom view of the lower hemispherical member, showing the relationship of the apertures to the X and Y axes;

FIG. 6 is a cross sectional view of the orientation sensor along the spherical housing X-axis shown in FIG. 4 and FIG. 5;

DESCRIPTION OF THE PREFERRED EMBODIMENT

Figure 1:
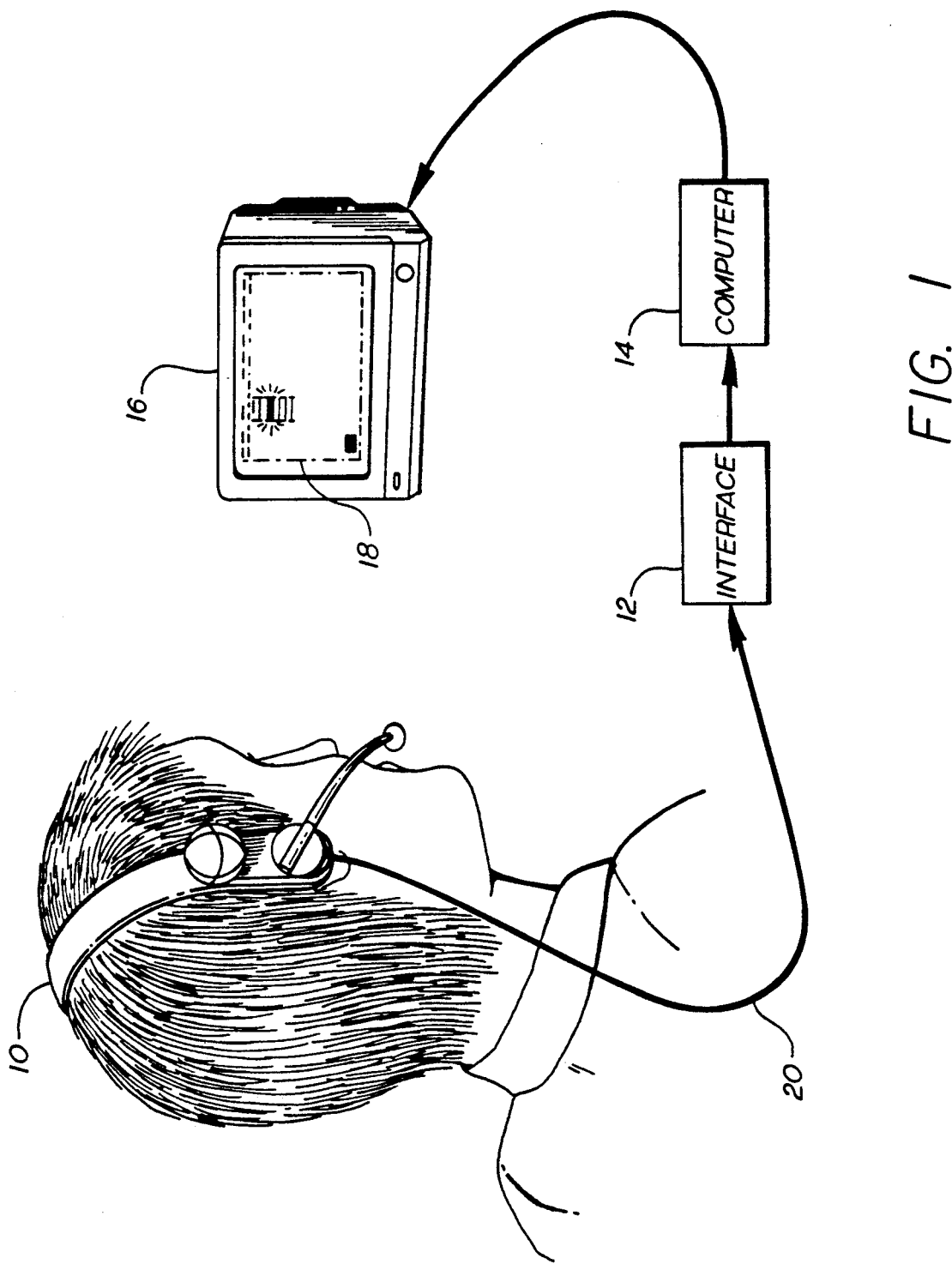
FIG. 1 is a simplified view of a graphics input system which uses the present invention.

FIG. 1 illustrates a graphics display system which embodies the computer input device of the present invention. The system includes a computer input device 10, an interface 12, a computer 14, and a display terminal unit 16 having a display screen 18.

The computer input device 10 is in the form of a headset to be worn by the computer user. The computer input device 10 includes an orientation sensor which provides an electrical analog signal that is related to the angle of tilt of the sensor as determined in two axes. The user conveniently wears the device in the manner of a conventional audio headset. By controlling the orientation of the device by simple angular head movements, left-to-right, forward-to-back, or combinations of the two, the user effects a corresponding movement of a cursor displayed on the display screen 18. The computer input device 10 includes circuitry to digitize the analog signals generated by the orientation sensor for processing by the interface 12 and transmission to the computer 14. A microphone and preamplifier circuit are also included, which, together with voice control circuitry in the interface 12, allows the user to perform standard select functions.

A cable 20 carries digitized signals from the computer input device 10 to the interface 12. The interface 12 contains a programmed microcontroller for receiving digitized signals from the computer input device 10 and translating those signals into control signals which can be interpreted by the computer 14, which in turn controls the display terminal unit 16. The interface 12 includes voice control circuitry which provides a speaker independent voice detection of two primary sound types— fricative and voiced sounds. The interface 12 is programmed to simulate the operation of a standard cursor control device, and provides a standard RS-232C output to a conventional digital computer 14. This specific circuitry will be discussed in more detail in connection with FIGS. 14 through 17.

In the preferred embodiment, the display screen 14 is a standard cathode ray tube, but any screen type may be used, including liquid crystal or projection displays.

Also in the preferred embodiment, the computer input device 10 simulates the functioning of a graphics input tablet. A user can therefore manipulate displayed data, make menu selections, or input graphic information on the display screen 18, as illustrated in FIG. 1. Other devices may be easily simulated, such as conventional "mouse." The manner in which the present invention operates will be discussed further in what follows.

Figure 2A:
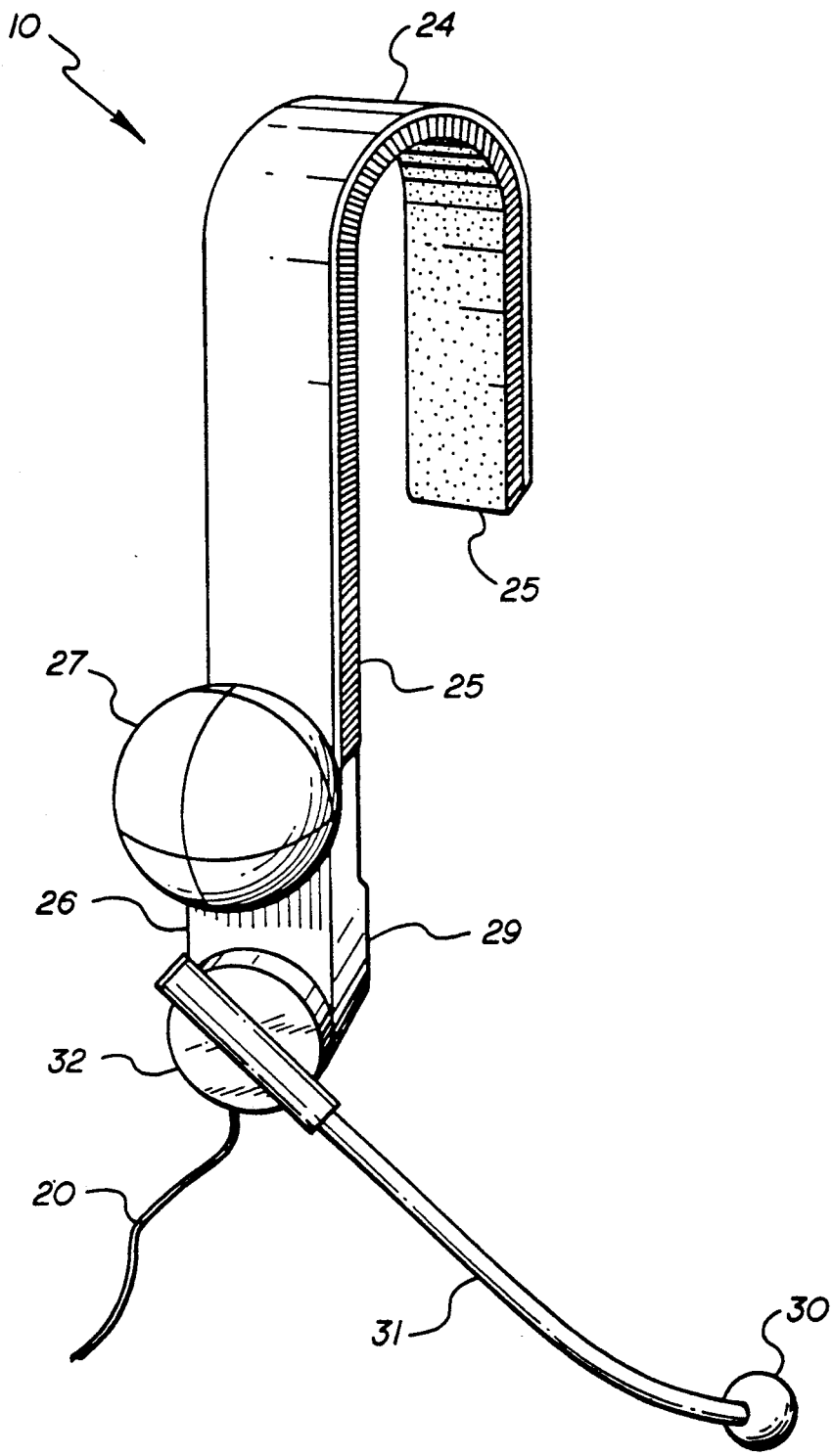
FIG. 2A is a perspective view of the present invention.
Figure 2B:
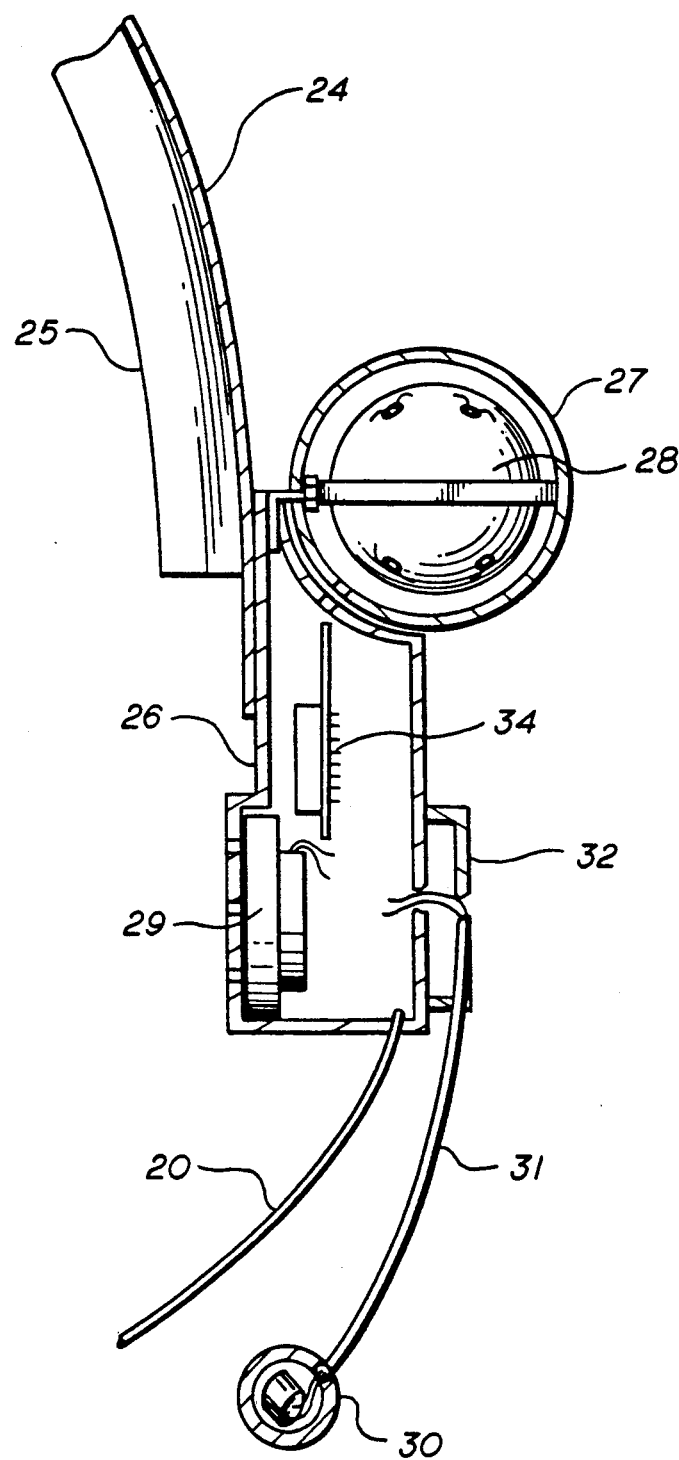
FIG. 2B is a diagrammatic illustration in practical cross section of the present invention, showing the location of the internal components.

Turning now to FIGS. 2A and 2B, the major components of the computer input device 10 are diagrammatically illustrated. The computer input device 10 includes a headband 24, preferably molded of durable plastic and having a shape and dimensions to fit comfortably around the head of the computer user. The headband 24 includes a soft foam insert 25 for supporting the headband 24 in a manner which is comfortable to the user. These considerations for user comfort are especially important when the anticipated user may be physically disabled or for any other reason where the computer input device 10 would be worn for extended periods of time.

A circuitry housing 26 is fixedly mounted on an end portion of the headband 24. A generally spherical sensor housing 27, contains an orientation sensor 28. The sensor housing 27 mounts to the circuitry housing 26 with a screw/bushing arrangement, allowing the sensor housing 28 to be pivoted by means of finger pressure. The angle of the spherical housing 27 may thus be adjusted with respect to the headband 24. This allows the user to initially center the cursor on the display screen 18.

An earphone 29 is mounted in the circuitry housing 26 and positioned for operator comfort. As shown in FIG. 2B, the earphone 29 will not press against the user's ear during normal use, due to the locations of the foam insert 25 and the circuitry housing on the headband 26. The earphone 29 is used as an audio receiving device in certain computer applications including voice mail and audio messaging. In one application, as will be described in more detail further on, the computer input device 10 provides a handicapped user with the ability to dial telephone numbers and conduct standard telephone communications through the computer 14, with the earphone 29 serving as the sound receiver.

A microphone 30 provides the user with a means for making audio commands, used to initiate conventional control functions, such as RETURN or SELECT. The circuitry associated with this function will be described in detail further on. The microphone 30 is a conventional miniature directional microphone mounted on a microphone support member 31 and a pivot member 32. By means of the pivot member 32, the microphone 30 is adjusted upwardly or downwardly for positioning in front of the user's mouth.

A printed circuit board 34 contains the electronic circuitry for the computer input device 10. More specifically, this includes a preamplifier for the microphone 30, analog circuitry for the operation of the orientation sensor 28 and digital circuitry for communication with the interface 12. Interconnection wiring between the printed circuit board 34, earphone 29, cable 20, orientation sensor 28, and microphone 30 are not shown in FIG. 2B for simplicity. The microphone 30 is also connected through the preamplifier to the earphone 29, providing voice feedback to the user, as in a conventional telephone handset.

The cable 20 exits the lower portion of the circuitry housing 26, so that is will cause minimum interference during operation of the computer input device 10. Although direct cabling is used in the preferred embodiment to keep the computer input device 10 inexpensive, it is within the scope of the present invention to link the computer input device 10 to the interface 12 by means of conventional miniature transmitter or transceiver technology.

The orientation sensor 28, which is a major component of the present invention, will be described in considerable detail. The orientation sensor 28 is fixedly mounted within the sensor housing 27 as shown in FIG. 2B.

FIGS. 3 through 6 illustrate the structure of the orientation sensor 28. The orientation sensor 28 includes a spherical housing 38 having upper and lower hemispherical members 40, 42 which mate together to form a hollow spherical enclosure. The upper hemispherical member 40 includes a circular ridge 44 and four apertures 46–52 which are spaced 45 degrees from the horizontal. The lower hemispherical member 42 includes a circular collar 54 and a circular recess 56 therein for receiving the circular ridge 44 when the upper and lower hemispherical members 40, 42 are mated to form the completed spherical housing 38. The lower hemispherical member includes four apertures 58–62 which correspond to those in the upper hemispherical member 40. These apertures 58–64 are also spaced 45 degrees from the horizontal as shown in FIG. 3.

The four apertures 46–52 in the upper hemispherical member define X and Y axes as shown in FIG. 4, and the same is true for the apertures 58–64 in the lower hemispherical member 42 as shown in FIG. 5. When the hemispherical members 40, 42 are mated, the apertures associated with each axis are precisely aligned.

The four apertures 46–52 in the upper hemispherical member 40 receive light sources or LEDs and the four apertures 58–64 in the lower hemispherical member receive photosensors or phototransistors. The LEDs and phototransistors are mounted with an adhesive which provides a liquid tight seal.

FIG. 6 presents a cross sectional view of the fully assembled orientation sensor 28 taken along the X axis shown in FIG. 4. Light emitting diodes 68, 70 are shown mounted in apertures 46 and 50, and phototransistors 72, 74 are shown mounted in apertures 58 and 62.

The spherical housing 38 is advantageously fabricated from Noryl, a plastic which is opaque with a non-reflective matte finish. It is particularly important for the inner wall 74 of the spherical housing 38 to be generally non-reflective, or proper operation of the orientation sensor 28 could be affected by stray reflections.

The LEDs 68, 70 are directly opposed to the phototransistors 74, 72 along the diameter of the spherical housing 38. Therefore, light emitted from each LED would normally pass through a center point of the spherical housing 38 and be received by the opposite phototransistor. However, the spherical housing contains a transparent fluid 76 which refracts the light emitted in a manner which is central to the present invention.

The transparent fluid 76 has a desirable index of refraction and viscosity. The transparent fluid 76 fills the sphere to precisely the one-half level within the spherical housing 38. The properties considered important in the selection of the transparent fluid 76 are viscosity and index of refraction.

In response to tilting of the orientation sensor 28, the transparent fluid 76 flows among the inner wall 74 of the spherical housing 38 to regain equilibrium. The rate of fluid movement and hence the response speed of the orientation sensor 28 is related to the viscosity of the transparent fluid 76. Fluid having a low viscosity flows more readily than a fluid with a higher viscosity, which would translate into faster cursor movement on display screen 18. A higher viscosity fluid provides a damping effect.

In the preferred embodiment, the transparent fluid 76 is castor oil, which has an absolute viscosity of 986 centipoise at 20 degrees Centigrade. Mineral oil (absolute viscosity=70.4 centipoise) has also been used effectively but results in a faster response speed.

When the spherical housing is sealed, air 78 is trapped therein, above the level of the transparent fluid 76. As light emitted from the LEDs 68, 70 strikes the boundary between the air 78 and the transparent fluid 76, a certain part of the light beam is reflected upwardly, but in general a much larger part passes into the transparent fluid 76 at an angle of refraction. The index of refraction of most transparent liquids fall in the range of 1.35 to 1.55. It is desirable to choose a transparent liquid with the highest practical index of refraction to provide the greatest angles of refraction and therefore the greatest signal differentials. Castol oil, used in the preferred embodiment, has an index of refraction of 1.477.

Figure 7B:
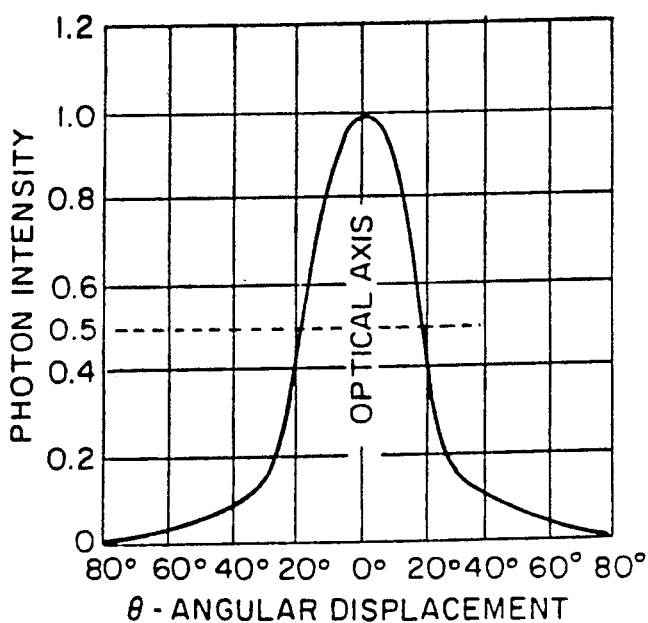
FIG. 7B illustrates, graphically, the relationship between the photon intensity of the beam and displacement angle for the LED shown in FIG. 7A.
Figure 7A:
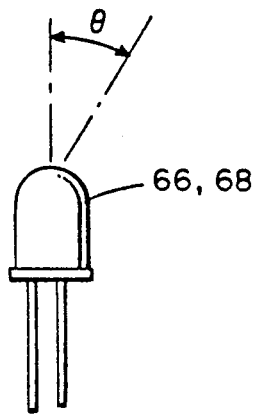
FIG. 7A illustrates an LED, showing in particular the displacement angle from the optical axis of the emitted beam.

The LEDs 68, 70 and the phototransistors 74, 72 are spectrally and mechanically matched. In the preferred embodiment. Type TIL39 light emitting diodes and Type TIL78 phototransistors (both manufactured by Texas Instruments, Inc. of Dallas, Tex.) are used. FIG. 7A and FIG. 7B illustrates the typical optical parameters of the LEDs 68, 70 showing in particular how photon intensity varies with angular displacement from the optical axis of the device. It is significant to note that photon intensity follows a Gaussian-shaped curve. At an angle 20 degrees from the optical axis, photon intensity decreases to 50 percent of the maximum value at the optical axis. The phototransistors 74, 72 have similar characteristics in the sensing of light.

FIG. 8 illustrates the functioning of a single LED/-phototransistor pair at various angles of rotation with respect to the vertical axis 79. The LED 70 and photodetector 72 are disposed on the same beam axis 80 which passes through the center point of the spherical housing 38.

Figures 8A, 8B, 8C:
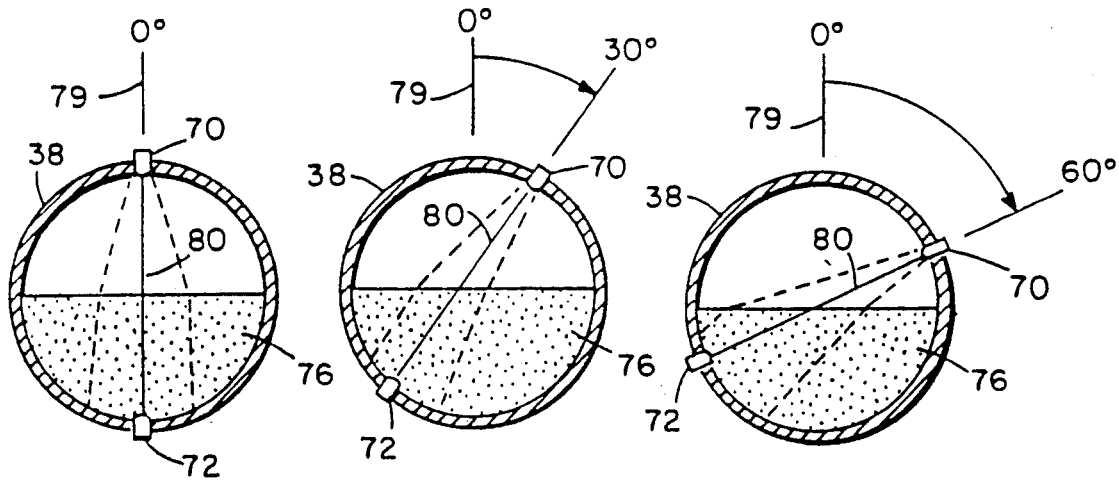
FIGS. 8A, 8B, 8C illustrate the functioning of a single LED/phototransistor pair at various angles of rotation.

In FIG. 8a, the beam axis 80 is perpendicular to the surface of the transparent fluid 76 and the angle of refraction is zero. The light beam, represented in the FIG. 8 as the region within the dotted lines, is refracted inwardly toward the phototransistor 72, producing a collimating effect. The maximum amount of light is received by the phototransistor 72.

In FIG. 8b, the spherical housing 38 has been rotated 30 degrees from the vertical axis 79, and the light beam is refracted downwardly from the beam axis 80 which passes through the LED/phototransistor pair. The refracted signal detected by the phototransistor 72 is decreased.

Finally, in FIG. 8c, the spherical housing 38 has been rotated 60 degrees from the vertical axis 79. The angle of refraction is greater still, and the refracted signal detected by the phototransistor is decreased further.

Figure 9:
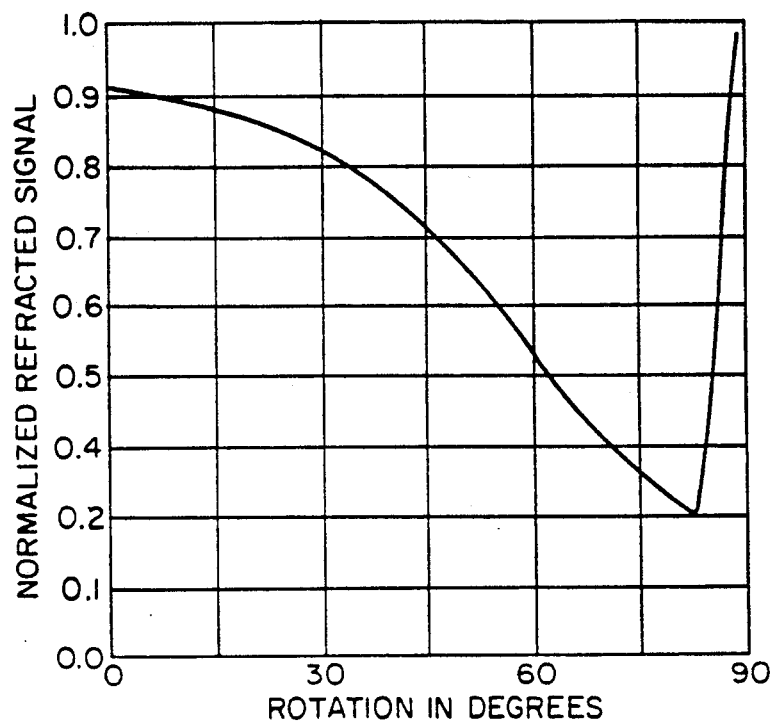
FIG. 9 illustrates, graphically, the relationship between the angle of rotation and the magnitude of the refracted signal for the LED/phototransistor pair shown in FIG. 8.

This relationship can be more clearly seen in FIG. 9, which plots the angle of rotation against the refracted signal, as detected by the phototransistor 72. As the spherical housing 38 is rotated with respect to the vertical axis 79, the angle from the vertical axis 79 to the beam axis 80 will increase, and the refraction angle of the light beam will also increase, though not to the same degree. The signal detected by the phototransistor decreases until the angle of rotation from the vertical axis 79 approaches 90 degrees, where the light beam passes from the LED 70 to the phototransistor 72 on the surface of the transparent fluid 76, and the signal intensity increases to maximum.

Figure 10:
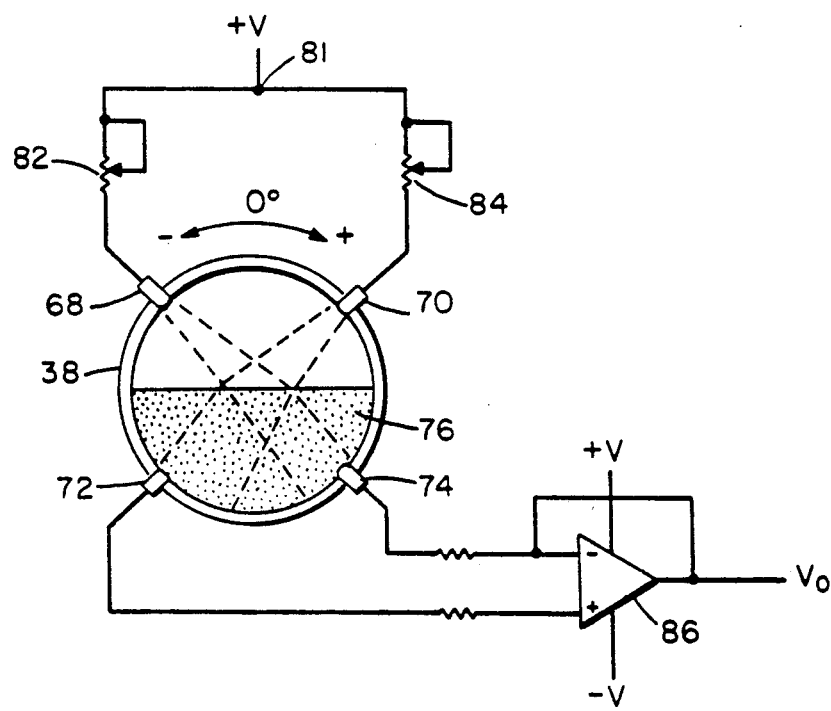
FIG. 10 illustrates the electrical function of a single axis of the present invention, showing in particular the analog circuitry associated with that axis.

FIG. 10 illustrates one axis of the present invention, showing in particular the analog electrical circuitry associated with that axis. A single voltage source 81 supplies the LEDs 68, 70, and the light intensity is balanced by means of individual potentiometers 82, 84. The output of the phototransistors 72, 74 are applied to a differential amplifier 86. In FIG. 10, the LEDs 68, 70 are 45 degrees above the surface of the transparent fluid 76, and the output of the differential amplifier 86 is zero because the output voltages of the phototransistors 72, 74 are balanced at 50 percent of their maximum value. When the spherical housing 38 is rotated in the positive or negative direction, the output voltage of the differential amplifier 86 varies in the positive or negative direction with the magnitude indicating the angle of rotation.

Figure 11:
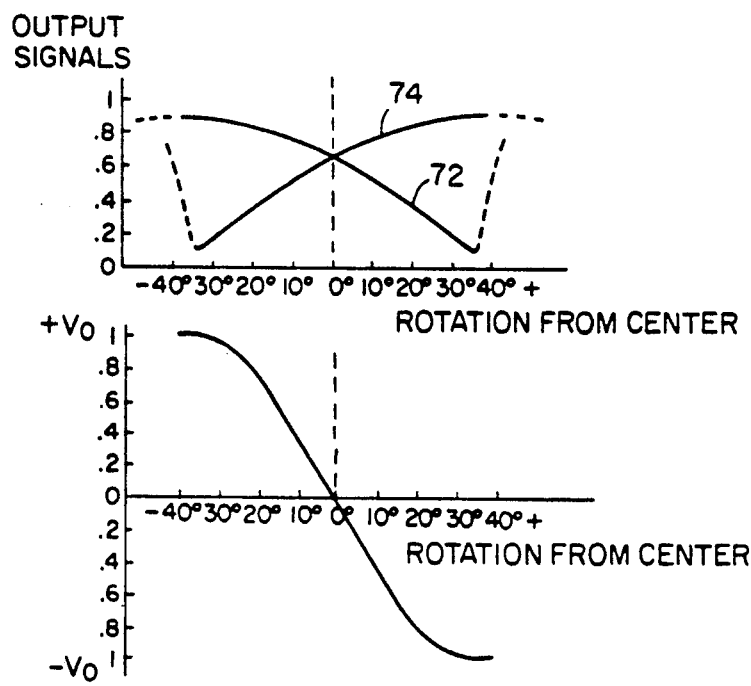
FIG. 11 illustrates, graphically, the relationship between the angle of rotation of the spherical housing and the output of the differential amplifier shown in FIG. 10.

FIG. 11 shows the relationship between the angle of rotation of the spherical housing 38 and the output of the differential amplifier 86. The orientation sensor 28 detects rotation angle from zero to 45 degrees in either the negative or positive direction as defined in FIG. 10.

Figure 12:
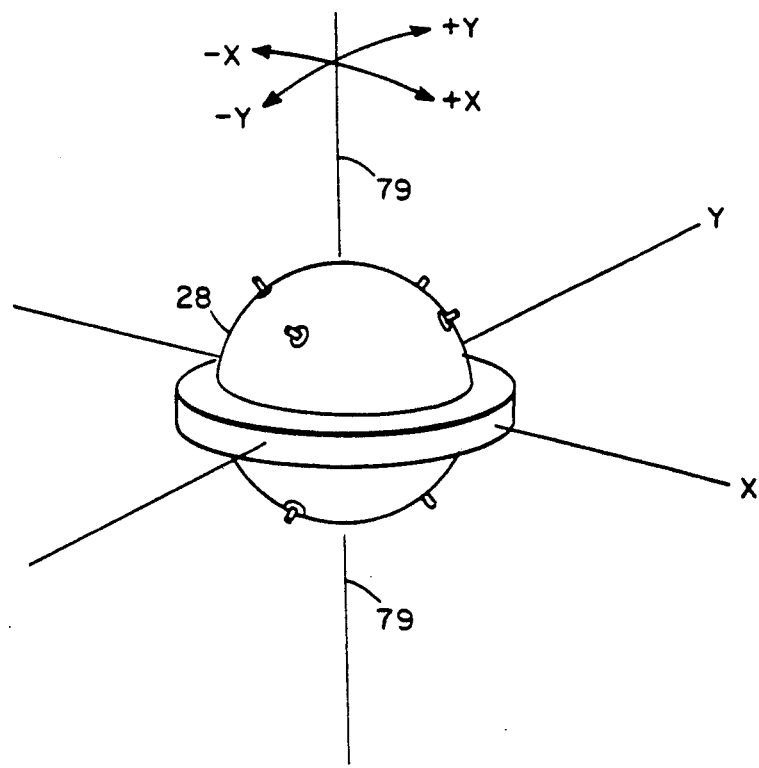
FIG. 12 illustrates the orientation of the present invention in the X and Y axes.

FIG. 12 depicts the orientation sensor 28 operating in two axes. The orientation sensor 28 detects rotation in any direction from the vertical axis 79. Furthermore, there is no unwanted interaction between the X and Y axis. If rotation is solely in the direction of the X axis, for example, the Y axis output of the differential amplifier 86 will remain zero because both phototransistors 72, 74 will detect an equal decrease in light intensity.

Figure 13:
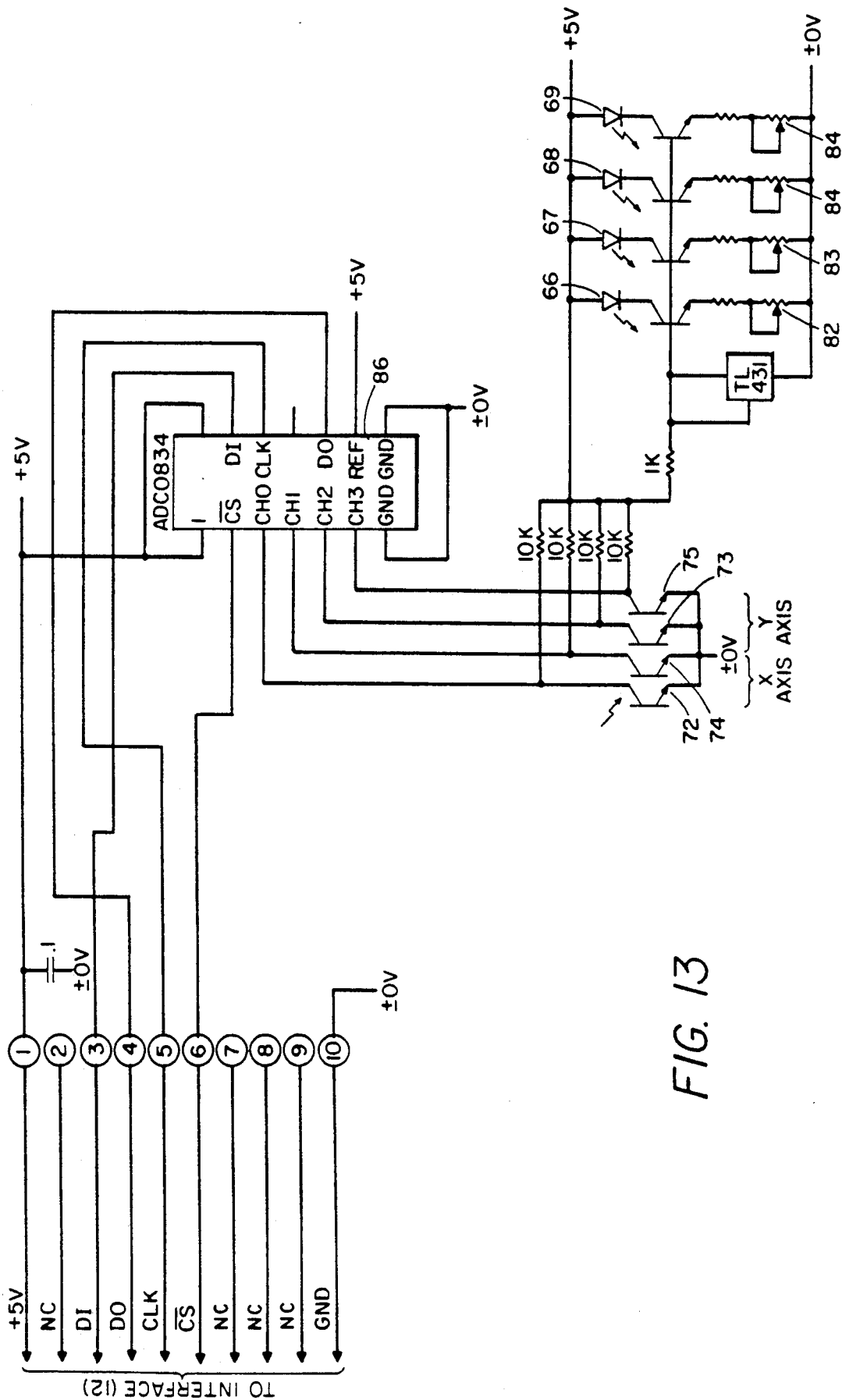
FIG. 13 illustrates the electrical circuitry of the computer input device of the present invention.

Turning now to FIG. 13, the electrical circuitry of the present invention is shown in more detail. Each of the four LED's 66–69 has an associated adjustment potentiometer 82–85, for adjustment of LED intensity. The LED's 66–69 are independently adjustable to provide a means for calibrating the orientation sensor 28 at the time of manufacture and testing to overcome problems caused by tolerance variations in each LED/phototransistor pair.

The LED's 66-69 and the matched phototransistor pairs 72-75 provide input to a four-channel serial analog-to-digital converter 86. In the preferred embodiment, the IC chosen is a Texan Instruments type ADC0834. The analog-to-digital converter employs a data comparator structure to differentially compare the input signals in pairs and output data bytes with eight-bit resolution which indicate the resultant magnitude and sign of the compared signals. Clock (CLK) and chip strobe (CS) are received from the interface 12 for scanning orientation sensor 28. Data is output serially on line DO in response to a chip strobe (CS).

Figure 14:
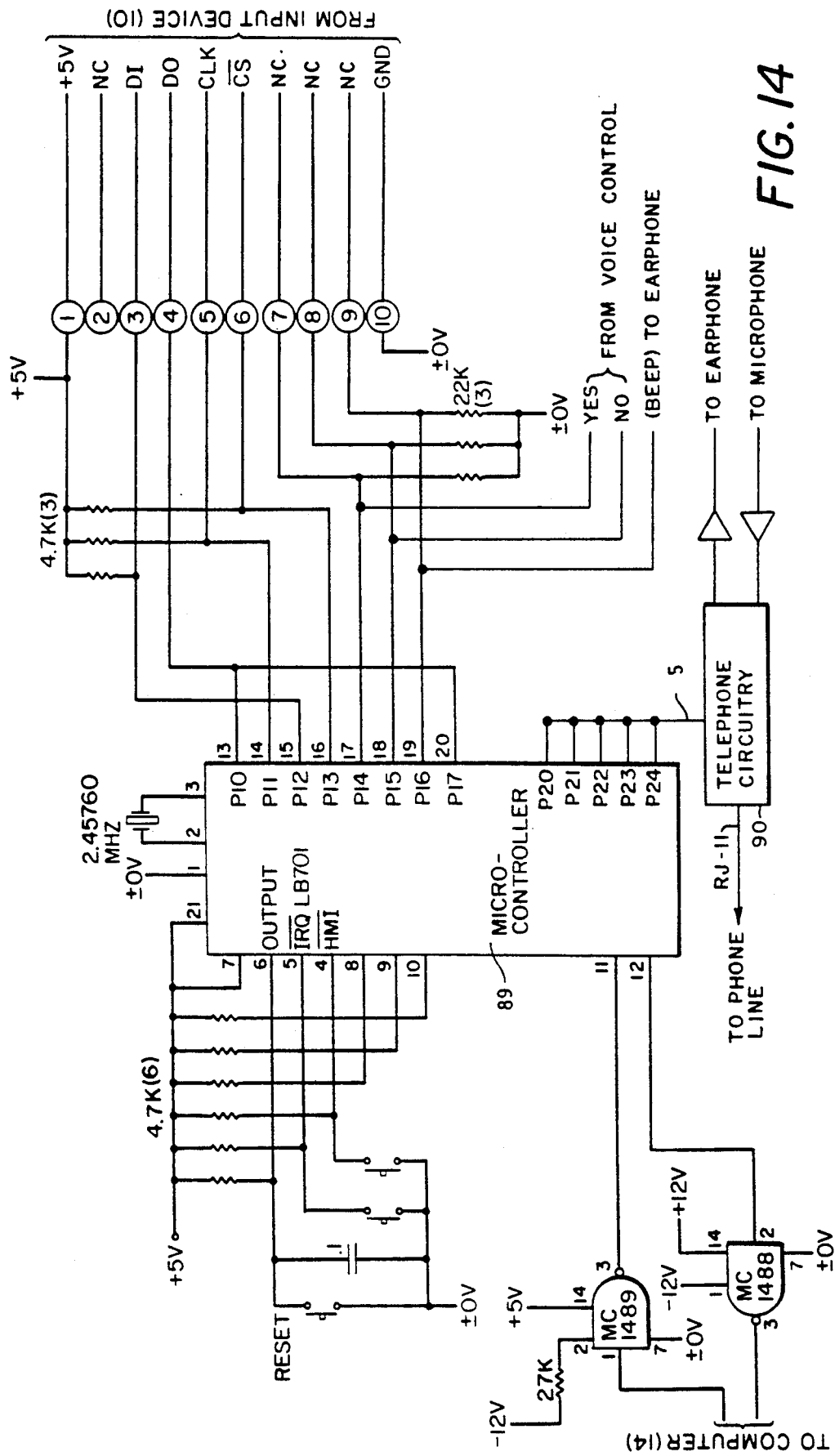
FIG. 14 illustrates the electrical circuit of the interface used with the present invention.
Figure 15:
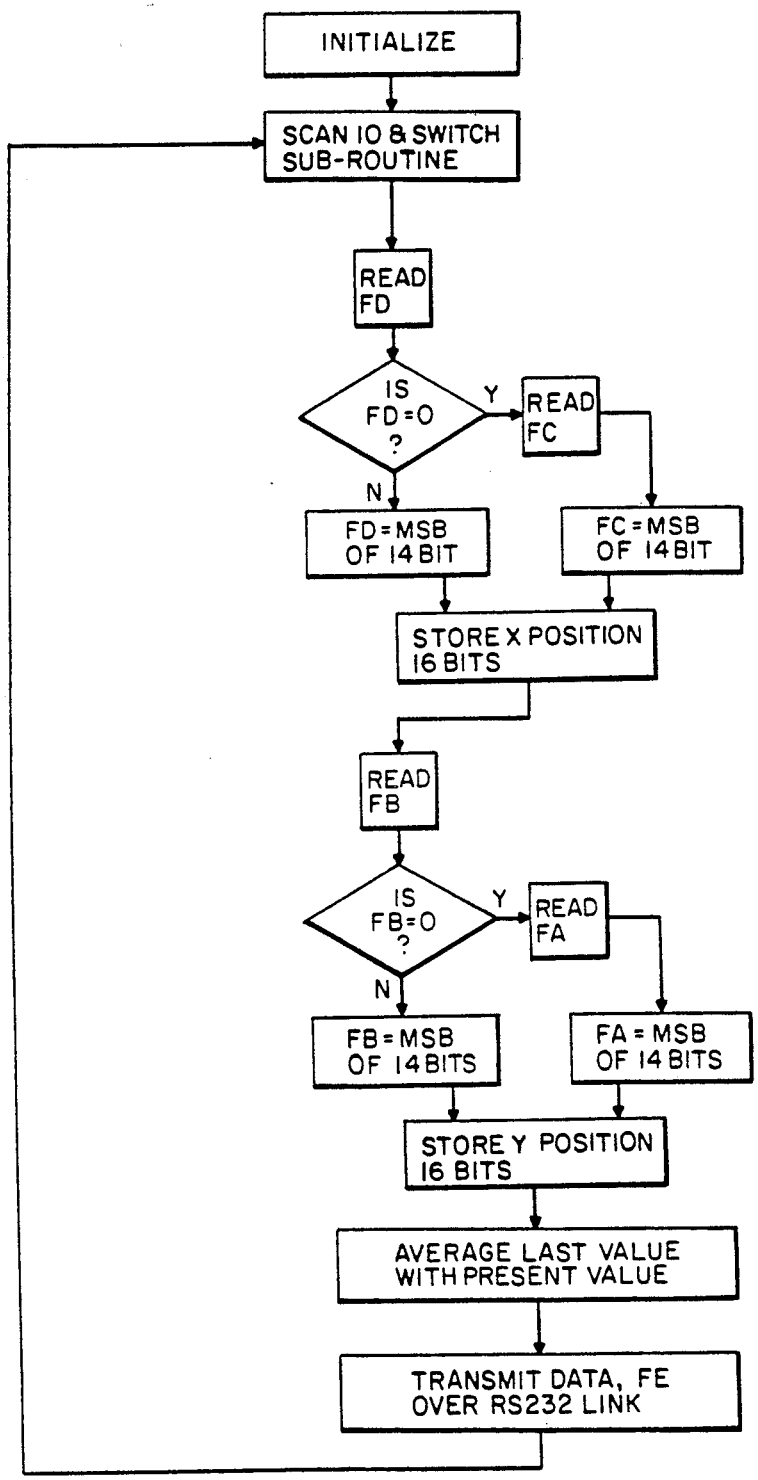
FIG. 15 shows, in flow chart form, the microcontroller microprogram of the interface used with the present invention.

FIG. 14 illustrates the major circuitry of the interface 12. The microcontroller 89 is a Motorola type 68701, which has a microprogram to calculate the X and Y positions of the orientation sensor 28, format the position data to simulate the operation of a graphics input device, and present the data to the computer 14. Referring now to FIG. 15, a flow chart is shown of the microcontroller 89 microprogram. Generally, upon initialization, the microprogram causes the microcontroller 89 to monitor the computer input device 10 including the voice control signals (data FE). The microcontroller reads the eight bit positive X-axis byte (FD) or, if zero, the negative X-axis position byte (FC) and stores the X position data as the most significant of 14 bits. Upon calculating X, the microprocessor 89 calculates the Y-axis positional data (FB & FA) the same way. The stored X and Y position words are then averaged with the present X an Y values, and the result is transmitted over an RS-232 link to the computer 14, along with the voice control data FE.

In addition, the microcontroller 89 provides an audio feedback signal (beep) to the earphone 29 whenever a "yes" or "no" or sound-equivalent command is received from the voice control circuitry. The interface 14 also includes telephone circuitry 90, coupled to a telephone line by a standard RJ-11 connector and to the microcontroller 89. When activated by the microcontroller 89, the telephone circuitry 90 provides the user with standard telephone communication functions through the microphone 30 and the earphone 29.

Figure 16:
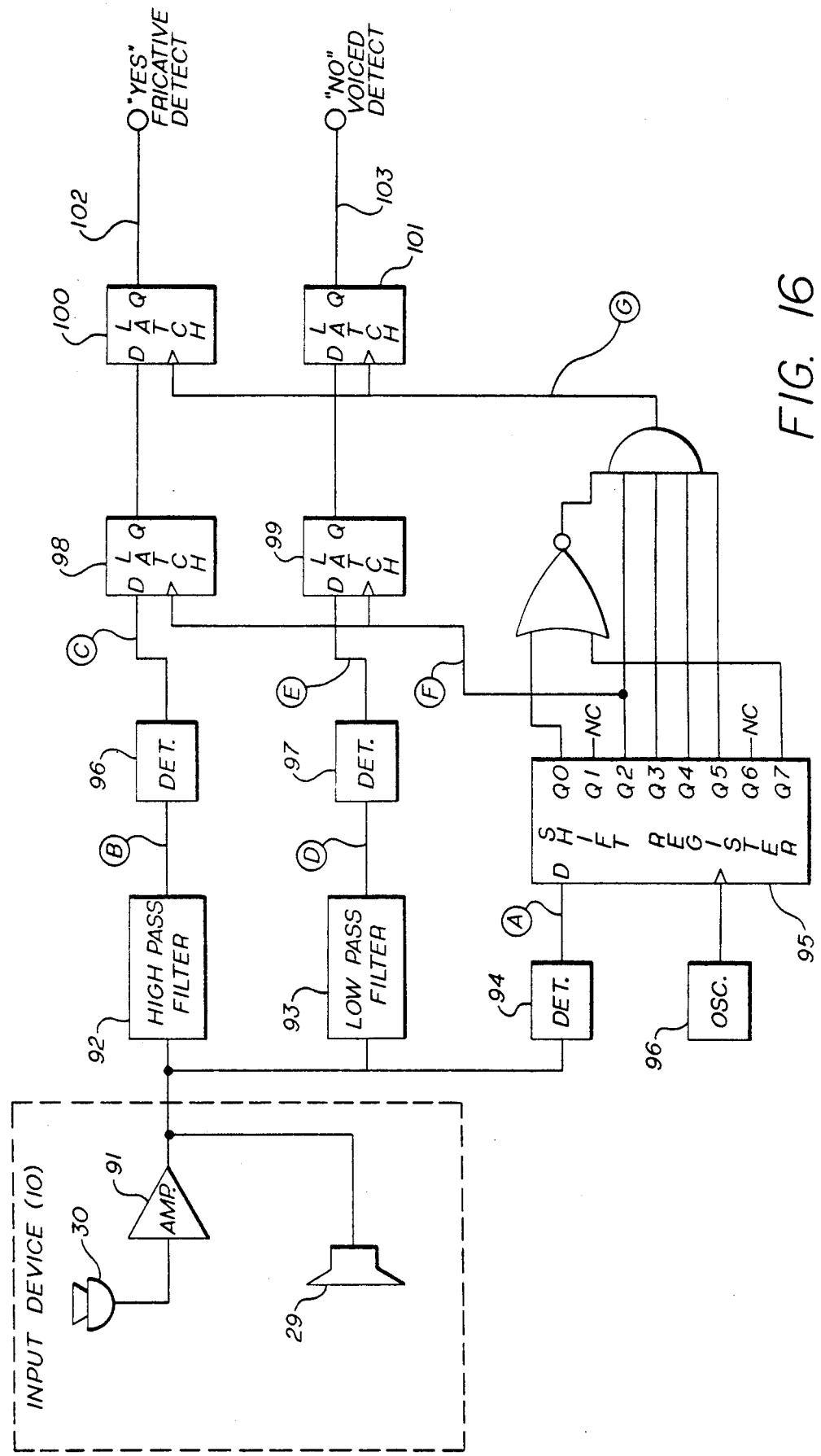
FIG. 16 illustrates the voice control circuitry of the present invention.
Figure 17:
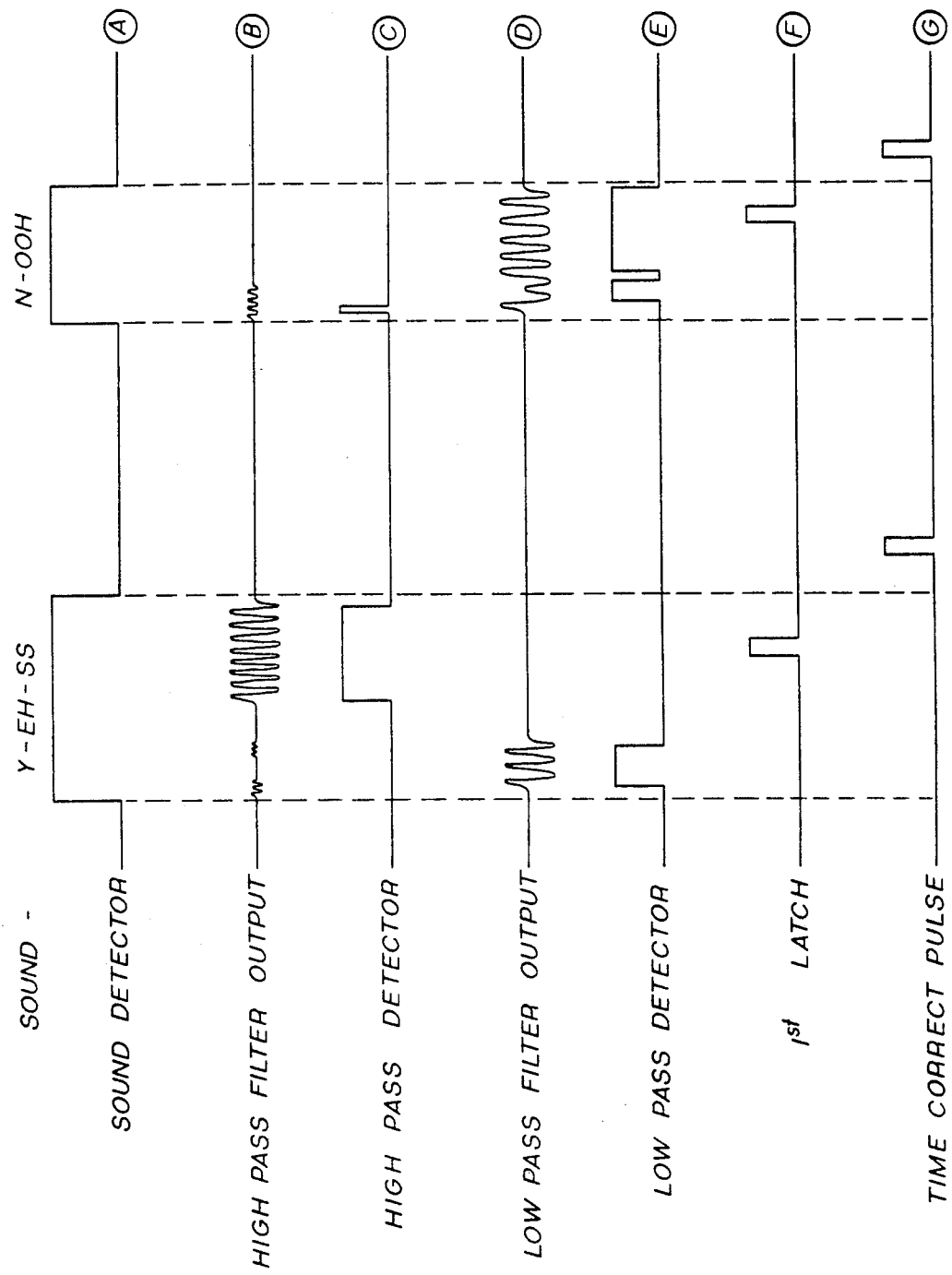
FIG. 17 illustrates the timing diagrams associated with the voice control circuitry of the present invention.

Turning now to FIGS. 16 and 17, the voice control circuitry, located within the interface 12, will be described. FIG. 16 shows a block diagram, and FIG. 17 shows the output waveforms and the timing relationships associated with the outputs of the various blocks.

The voice control circuitry is basically a two-sound speech recognition device. The present invention depends on the characteristic frequency ranges of certain phonetic sound types, rather than on specific words spoken in specific languages. The frequency range of voiced sounds (caused by vibration of the vocal cords) are generally lower than the frequency range of fricative sounds (caused by air moving through narrowed air passages in the mouth). Words such as "no" end in a voiced sound; most vowels are voiced sounds. Words such as "yes" end in a fricative sound ("sss").

The present speech recognition device detects short words that end in voiced or fricative sounds, such as "yes" and "no." Further, the sounds must be spoken in an isolated manner, rather than as part of continuous speech. In this way, conversation in the vicinity of the user will not cause display control commands to be initiated.

The voice control circuit of the present invention is especially useful where the user speaks only a foreign language or possesses a speed difficulty or disability. In this case, the computer input device 10 may still be used effectively, as long as the user can make any voiced and fricative sounds. Furthermore, it is speaker independent and requires no training sessions with the user, as is required with some other speech recognition devices.

Microphone 30 receives the user's voice command, which is amplified by preamplifier 91, which also attenuates any frequency component below 100 hertz. The microphone 30 and preamplifier 91 are located within the computer input device 10. As shown in FIG. 16, the output of preamplifier 91 provides feedback to the earphone 29, as in a conventional telephone receiver. The output signal from amplifier 91 is also presented to a high pass filter 92, a low pass filter 93, and a detector 94. The high pass filter 92 rejects all signal frequencies under below 1500 hertz. The low pass filter 93 rejects all signal frequencies above 400 hertz. The detector 94 outputs a logic high whenever a sound signal is received by the microphone 10. The logic high signal from the detector 94 is clocked through an eight-bit shift register 95, by an oscillator 96, operating at in the 20 to 30 hertz range.

The output signals of the high pass filter 92 and the low pass filter 93 are presented to detectors 96, 97 which square up the signals. These outputs, in turn, are presented to latches 98, 99 which are clocked by the third bit of the shift register 95. By using the third bit by instead of the first, the voice control circuitry disregards the first part (approximately 150 milliseconds) of the command word and determines whether the last part of the command word is a voiced fricative sound.

Finally, the output of the shift register 95 is gated such that a logic high occurs if and only if the received sound has a duration of 250 to 400 milliseconds and is preceded and followed by a momentary pause in the audio signal. Any sound longer or shorter than the specified window size is ignored, along with those which are part of a continuous stream of sound, such as words embedded in sentences. When the command word has the correct parameters, it is clocked through a latch 100 if it ends in a fricative or through a second latch 101 if it ends in a voiced sound. The output signals 102, 103 are then presented to the microcontroller 89.

Figure 18:
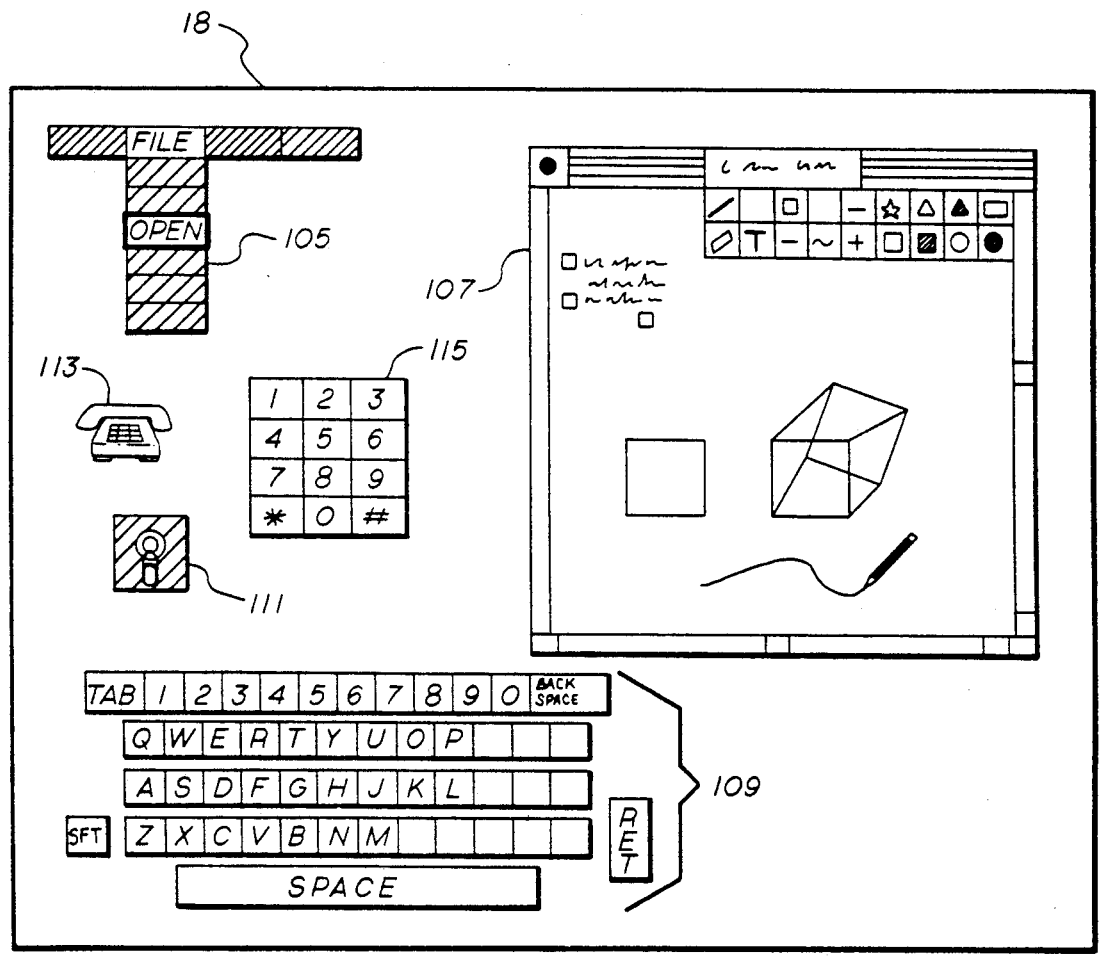
FIG. 18 illustrates a conventional computer display screen, showing, in particular, several of the many uses of the present invention.

The operation of the computer input device 10 will be appreciated by referring now to FIG. 18. The headband 24 is fitted around the user's head in the manner of a conventional headset. A user having severe physical disabilities may require assistance to accomplish this. With the computer input device 10 in place, along with the interface 12 and the computer 14, the user will then be able to perform all manner of cursor movement and control, without the need for a flat table surface, without aiming at the screen, and without the use of hands. It will be found advantageous to initially pivot the sensor housing 27 upwardly or downwardly to set the cursor in the general center of the display screen.

Cursor movement is effected when the computer user tilts his head front-to-back or side-to-side corresponding to rotation toward the X-axis or Y-axis, shown particularly in FIG. 12. A forward tilting rotation causes a downward movement of the cursor on display screen 18. A backward tilting rotation causes an upward movement of the cursor. A rotation to the left causes a leftward movement of the cursor, and a rotation toward the right causes a rightward movement of the cursor.

The speed of cursor movement corresponds to the rotation angle of the computer input device 10.

To initiate conventional cursor control select functions equivalent to SELECT or RETURN, the user simply speaks the words "yes" or "no" into the microphone 30 when the cursor has been moved to the proper choice on the screen. Instead of the command words specified, the user may substituted any pair of short command words that end in a voiced or fricative sound. The earphone 29 provides the user with a confirmation "beep" tone for each sound type.

FIG. 18 shows a typical display screen 18, on which various computer controlled applications have been displayed for use with the computer input device 10. The computer input device 10 may be used with any standard computer applications which operate with a conventional graphic input tablet. A pull down menu 105 is shown, along with a CAD drawing screen 107. There are many well known software packages which incorporate these features, and they can be used off-the-shelf, without any software changes or additional programming.

Some of the applications shown here are especially suitable for physically disabled users. For example, a keyboard 109 projected on the screen enables the user to choose alphanumeric sequences without the use of hands, requiring of the user only slight head movement and the ability to speak two sounds. The user moves the cursor to the desired alphanumeric key on the screen 18 and speaks an appropriate command word to input the chosen alphanumeric into the computer memory.

Various icons can be displayed and selected. In FIG. 18 a disk icon 111 is shown, which when selected, initiates a file retrieval or storage function. A telephone icon 113 is shown which will initiate a telephone application. The telephone application works in cooperation with the telephone circuitry block 90 shown in FIG. 14. When the telephone application is selected, the microcontroller 89 initiates operation of the telephone circuitry 90. The user moves the cursor to the individual digits of the displayed telephone keypad 115, and selects the desired telephone number in the manner of the alphanumeric keyboard 109. When the telephone call is in progress, the microphone 30 and the earphone 29 are used for telephone communication. Upon conclusion of the telephone call, the computer input device 10 resumes its normal operation.

Figure 19:
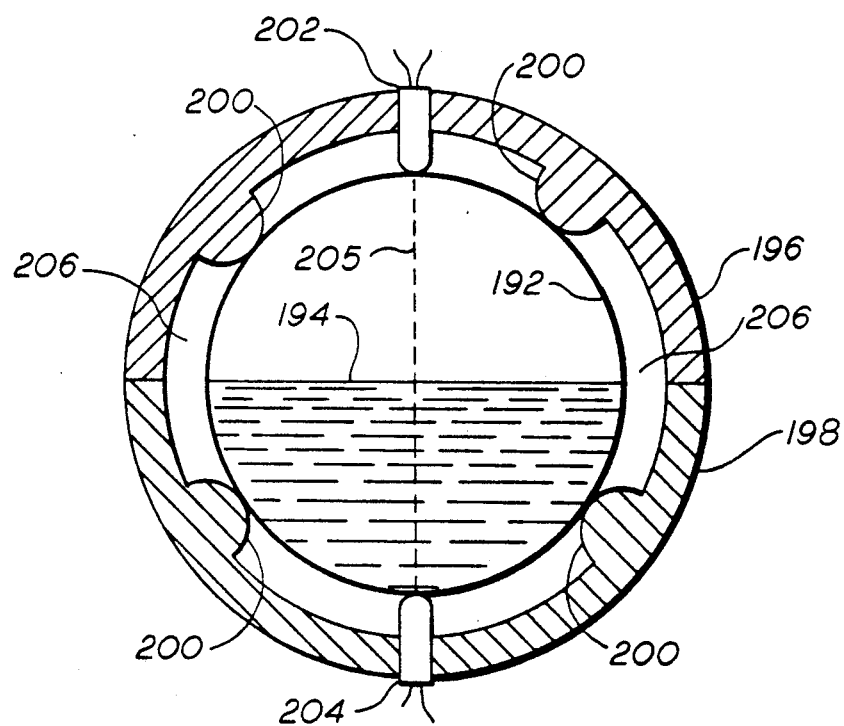
FIG. 19 illustrates an alternative embodiment of the orientation sensor.

In an alternative embodiment of the orientation sensor 28, shown particularly in FIG. 19, a hollow transparent sphere 192 is half-filled with transparent fluid 194. The hollow sphere 192 in disposed within an optically opaque spherical enclosure comprising upper and lower hemispherical members 196, 198. The upper and lower hemispherical members 196, 198 include support projections 200 for supporting the hollow sphere 192. At least one slight source 202 and one optical detector 204 are disposed in the upper and lower hemispherical members 196, 198 along an axis passing through the center of the transparent sphere 192. The light source 202 and the optical detector 204 are in contact with the hollow sphere 192. An air gap 206 separates the hollow sphere 92 from the upper and lower hemispherical members 196, 198. A preferred form of this embodiment will sense the magnitude and direction of angular change by means of four light source/photodetector pairs, each pair mounted opposingly on axes passing through the center point of the transparent sphere 192, and each light source/photodetector pair positioned 90 degrees from the others.

In view of the above, it will be seen that the several objects of the present invention are readily achieved and other advantageous results attained.

Obviously many modifications and variations of the present invention are possible in light of the above teachings, without departing from the spirit and scope of the invention. Although the computer input device is designed to simulate a graphics input device, the principles of the present invention are applicable to other computer input device types. Also, though a headset was chosen for the present invention, the novel orientation sensor and control circuitry could be housed in various convenient and useful shapes, including hand-held devices. Because the orientation sensor disclosed herein determines the direction and magnitude of angular change, it is naturally applicable to a wide range of uses including automatic leveling devices and robotic feedback control systems.

Moreover, in the preferred form disclosed herein, control functions are not limited to the display of a cursor on a display screen. For example, a motorized wheelchair equipped with a control system such as the one described could provide a handicapped user with speed and directional control, without the need for hands or limbs to operate control switches. In view of this, it is understood that the above description is illustrative rather than limiting.

What is claimed is:

1. A method for controlling a computer comprising the steps of:
   sensing the magnitude and direction of angular displacement of a user-movable housing independently of external means for a continuous range of angles with respect to a reference axis passing through said housing for a continuous range of directions;
   generating within said housing electrical signals representative of said magnitude and direction of angular displacement;
   detecting and discriminating at least two user-generated vocal sounds, and generating second electrical signals representative thereof; and
   translating said first electrical signals into control signals and translating said second electrical signals into computer command signals for transmission to a computer.

2. A device for controlling a computer comprising
   a housing;
   means, within the housing, for sensing the magnitude and direction of angular displacement of the housing for a continuous range of angles with respect to a reference axis passing through the housing for a continuous range of directions;
   means, within the housing, for generating first electrical signals representative of said magnitude and direction;
   means for detecting and discriminating at least two user-generated vocal sounds, and generating second electrical signals representative thereof; and
   means for translating said first electrical signals into control signals and translating said second electrical signals into computer command signals for transmission to a computer.

3. The device recited in claim 2 further including computer means responsive to said first and second electrical signals for controlling movement of a servomechanism.

4. The device recited in claim 2 further including computer means responsive to said first and second electrical signals for controlling movement of a motorized wheelchair.

* * * * *